Aug. 15, 1950     A. J. EDWARDS     2,518,981
RIVER WEIGHT
Filed Dec. 6, 1948
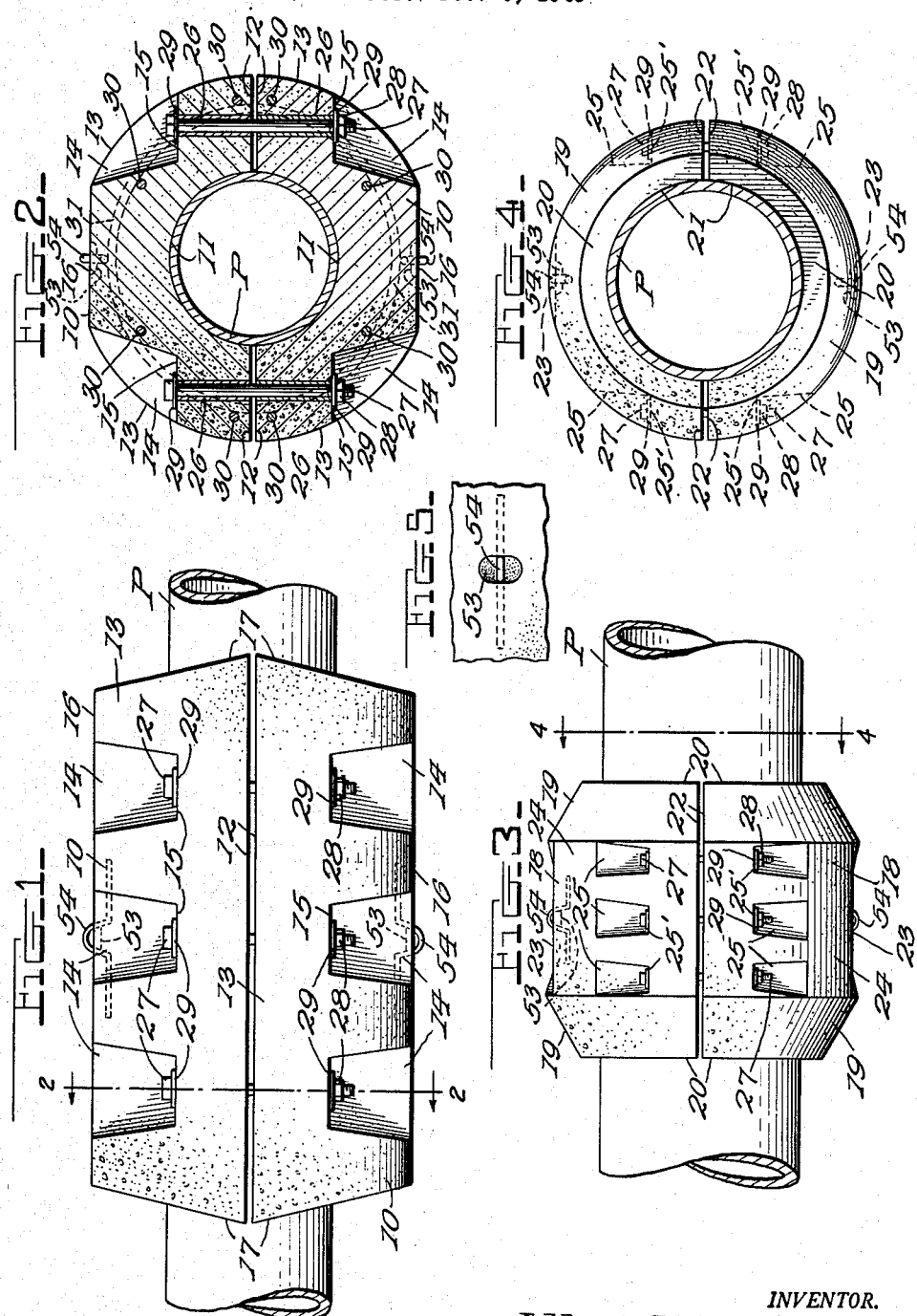
INVENTOR.
Allan J. Edwards,
BY Bryant & Lowry
attys.

Patented Aug. 15, 1950

2,518,981

UNITED STATES PATENT OFFICE 2,518,981

RIVER WEIGHT

Allan J. Edwards, Tulsa, Okla., assignor to
Allan Edwards, Inc., Tulsa, Okla.

Application December 6, 1948, Serial No. 63,683

2 Claims. (Cl. 138—25)

This invention relates to river weights such as are used to properly anchor pipes and conduits in the bottoms of streams and other bodies of water and has special reference to weights of this character constructed of concrete or the like.

One important object of this invention is to provide a river weight of this character having a novel configuration by which the weight resists displacement under the influence of water movements occasioned by stream flow, tidal action and the waves produced by storms.

Another important object of the invention is to provide a novel arrangement of river weights formed in sections held together, when in use, by bolts, so that the weights may have their sections assembled at any desired points on the length of a pipe or conduit.

A further important object of the invention is to provide a novel form of sectional river weight having pockets wherein are seated the heads of the bolts and nuts holding the sections together so that the bolt heads and nuts are protected from contact with obstructions and moving objects tending to break off such heads and nuts.

With the above and other objects in view, as will be presently apparent, the invention consists in general of certain novel arrangements of details and combinations of parts hereinafter fully described, illustrated in the accompanying drawings and particularly claimed.

In the accompanying drawings like characters of reference indicate like parts in the several views, and:

Fig. 1 is a side elevation of one form of river weight applied to a pipe.

Fig. 2 is a section on the line 2—2 of Fig. 1.

Fig. 3 is a side elevation of a second form of river weight.

Fig. 4 is a section on the line 4—4 of Fig. 3, and

Fig. 5 is an enlarged fragmentary plan view showing a hook engaging means for conveniently handling the weights.

In the form of the river weight shown in Figs. 1 and 2, each section of the weight is of generally semi-cylindrical form as at 10 and has a groove 11 extending from end to end so that on each side of the groove there is a flat face 12. In cross-section the groove 11 is slightly less than 180° in circumferential extent so that, upon two such sections being assembled on a pipe P the flat faces 12 are separated slightly as shown in Figs. 1 and 2. The curved faces 13 of the section are provided with longitudinally spaced pockets 14, these pockets having flat floors 15 parallel to the faces 12. The outer face portions 13 are separated by a flat face 16 and the ends of the section are bevelled as at 17.

In the form of the river weight shown in Figs. 3 and 4 each weight section is provided with a central semi-cylindrical portion 18 and terminates at its ends in segmental frusto-conical portions 19 having flat ends 20. River weights of the type disclosed herein are extremely heavy, approximately one thousand pounds, more or less, and handling and manipulation of such heavy weights is usually rendered extremely difficult. However, by the provision of the beveled ends 17 of the weight shown in Figure 1 and the frusto-conical portions or ends 19 of the weight shown in Figures 3 and 4, resistance to moving the weights is lessened and facilitates dragging of the weights. Between the ends 20 the section is provided with a longitudinally extending groove 21 the arcuate extent of which is slightly less than 180°. On each side of the groove 21 the section has a flat face 22 and the central portion 18 is flattened as at 23, this flat surface lying between the curved side faces 24 of this portion. In the curved faces 24 are molded a series of pockets 25 the bottoms of which are parallel to the faces 22. This form of the weight fits, in the same manner as the first form, on a pipe P.

By reason of the provision of the frusto-conical ends the weight is substantially streamlined so that it is little influenced by stream flow, eddies and tides. Also, during construction or repair of the line, these frusto-conical ends afford completely circular and uninterrupted rolling surfaces enabling the pipe held by the weights to be rolled laterally into position over the bottom of the body of water through which the pipe passes.

In each of these forms provision is made for clamping two of the sections on the pipe to be weighted and to this end, as best shown in Fig. 2, there is molded in each section the pipes 26, each pipe leading from the flat bottom 15 or 25' of a pocket 14 or 25 to a flat face 12 or 22. Through these pipes extend bolts 27 carrying nuts 28, washers 29 being disposed on the bolts between the bolt heads and nuts and the pocket bottoms. By tightening the nuts on the bolts the two sections are clamped firmly and immovably on the pipe P. It will be noted that since the bolt heads and nuts are located in pockets there will be practically no danger of contact with obstructions or moving substances tending to damage and break the bolts.

In order to reinforce the concrete there is molded into each section several longitudinally extending bars or rods 30 to which are welded parallel arch bars or rods 31 in spaced positions along the rods 30.

In order to facilitate the handling of the weight halves each half, during the molding, has formed centrally of its upper side an elongated pocket 53 across which passes a rod or loop 54 having its ends fixedly embedded in the concrete of the weight. This enables the hook of a chain hoist or other lifting device to be engaged around the rod 54 thus affording a convenient handling means.

What is claimed is:

1. In a river weight for anchoring pipes in water bottoms including a concrete block having a side provided with a centrally disposed and longitudinally extending pipe fitting groove, said side having equal flat portions extending from opposite sides of the groove, said block having equal segmento-cylindrical side faces each provided with pockets spaced therealong and having bottom faces parallel with said flat faces, said block having bolt-receiving openings each extending from a pocket bottom to a respective flat face, means for reinforcing those portions of the weight which extend between the bottoms of the pockets and said flat faces comprising bolt-receiving sleeves molded in said bolt-receiving openings and the ends of said block being of frusto-conical shape to facilitate dragging.

2. In a river weight for anchoring pipes in water bottoms including a concrete block having a side provided with a centrally disposed and longitudinally extending pipe fitting groove, said side having equal flat portions extending from opposite sides of the groove, said block having equal segmento-cylindrical side faces each provided with pockets spaced therealong and having bottom faces parallel with said flat faces, said block having bolt-receiving openings each extending from a pocket bottom to a respective flat face, means for reinforcing those portions of the weight which extend between the bottoms of the pockets and said flat faces comprising bolt-receiving sleeves molded in said bolt-receiving openings, longitudinal reinforcing rods disposed outwardly of said sleeves, and the ends of said block being of frusto-conical shape to facilitate dragging.

ALLAN J. EDWARDS.

REFERENCES CITED

The following references are of record in the file of this patent:

UNITED STATES PATENTS

| Number | Name | Date |
|---|---|---|
| 867,945 | Carson | Oct. 15, 1907 |
| 912,318 | McMahon | Feb. 16, 1909 |
| 1,182,872 | Darrow | May 19, 1916 |
| 1,569,660 | Massey | Jan. 12, 1926 |
| 1,877,094 | Welborn | Sept. 13, 1932 |
| 2,335,433 | Minick | Nov. 30, 1943 |
| 2,373,439 | Wheatley | Apr. 10, 1945 |
| 2,453,804 | McDearmon | Nov. 16, 1948 |

FOREIGN PATENTS

| Number | Country | Date |
|---|---|---|
| 743,207 | France | Mar. 27, 1933 |